INVENTOR.
THOMAS E. PHILIPPS
BY
*Staelin & Overman*
ATTORNEYS

Oct. 26, 1971　　　　　　T. E. PHILIPPS　　　　　3,614,936
NONWOVEN REINFORCEMENT STRUCTURE AND METHOD FOR PRODUCING IT
Filed May 9, 1969　　　　　　　　　　　　　2 Sheets-Sheet 2

INVENTOR.
THOMAS E. PHILIPPS
BY
Staelin & Overman
ATTORNEYS

United States Patent Office 3,614,936
Patented Oct. 26, 1971

3,614,936
NONWOVEN REINFORCEMENT STRUCTURE AND METHOD FOR PRODUCING IT
Thomas E. Philipps, Granville, Ohio, assignor to Owens-Corning Fiberglas Corporation
Filed May 9, 1969, Ser. No. 823,459
Int. Cl. B32b 7/08
U.S. Cl. 112—420
9 Claims

ABSTRACT OF THE DISCLOSURE

A nonwoven structure and method of making it where the structure includes short lengths of linear material such as glass strand united by nonadhesive means into a coherent body.

BACKGROUND OF THE INVENTION

Heretofore nonwoven reinforcement structures of only short or chopped lengths of linear material, such as glass strands, presented many difficulties to produce and process into articles they reinforced, viz plastic articles. In large measure the difficulties originate from the methods of producing the structures. Conventional methods rely on suitable adhesives to bond short or chopped lengths of linear material into a coherent body. A reinforcement structure of bonded or glued together short lengths of linear material is stiff and does not conform or shape well during molding, especially using molds having a good deal of curvature. Then too, nonuniformity of binder location within bonded structures establishes zones of binder concentration and binder exiguousness. This abundance of binder in some zones and meager presence of binder in other zones gives rise to a structure that is not sufficiently self sustaining in one region and too rigid in others. Such nonuniformity of binder location not only contributes to stiffness variations in the structure, but also adversely effects resins wet-out or absorption, the zones of higher binder or adhesive concentration being slower to wet-out.

Difficulty in curing adhesives located interiorly of a conventional nonwoven reinforcement structure limits the thickness such a structure may be effectively made. Because the outer materials tend to shield the adhesives within a bonded structure, acceptably curing such adhesives is difficult, especially in thicker structures. Consequently commercial bonded nonwoven structures tend to be fairly light weight, e.g. 3 ounces per square foot. On the other hand heavy weight nonwoven structures made according to the invention may easily be made, e.g. 14 ounces per square foot or more. One may use these heavier weight nonwoven structures to make thicker one ply laminates; which find wide use. For example, heavier weight nonwoven structures are ideal for "hand lay-up" molding of boat hulls.

Also, bonded structures, in spite of careful handling, tend to tear during handling and molding.

SUMMARY OF THE INVENTION

An object of the invention is an improved nonwoven structure and method for making it.

Another object of the invention is improved reinforced articles, especially thicker one ply glass reinforced plastic laminates.

Another object of the invention is a reinforcement structure of short lengths of linear material held together as a coherent body without the use of adhesives.

Yet another object of the invention is a coherent reinforcement structure of short lengths of linear material that possesses improved conformability and tear strength.

Still another object is a nonwoven reinforcement structure of chopped linear material such as glass strands that is united into a coherent body by thread or thread-like material.

Other objects and advantages of the invention will become apparent as the invention is hereafter described in more detail with reference made to the accompanying drawings.

DESCRIPTION OF THE PREFERRED EMBODIMENTS

While it is preferred to use multifilament linear material, including bundles of continuous filaments such as continuous filament glass strands, other linear material such as monofilaments or linear material including discontinuous filaments may be employed. Further, the invention may use twisted linear material such as continuous filament glass yarn, cord, etc. Moreover, one may employ linear material of other material such as nylon, polyester and the like. Also, one may use textured linear material such as chopped or short lengths of bulky yarn. The use of glass strand to explain the invention is by way of example only.

While it is not necessary, it is generally preferred to use continuous glass strand or roving having a larger number of filaments, e.g. 1,600 to 2,000 or more filaments; however, linear material having a fewer number of filaments, such as 200 to 800 or more, may effectively be employed and in certain applications may be preferred.

Figure 1:
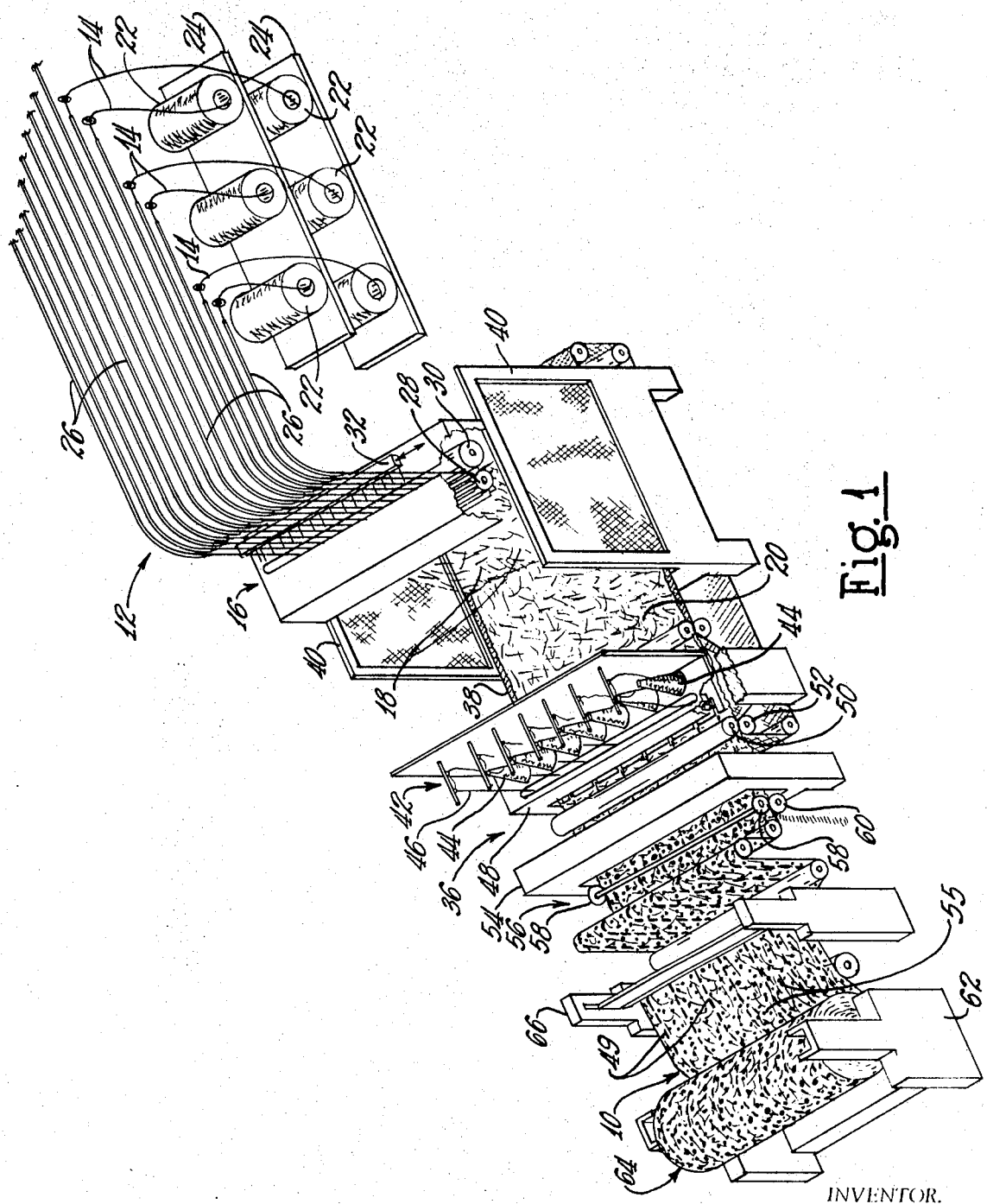
FIG. 1 is a view in perspective showing a nonwoven structure and apparatus for producing it according to the principles of the invention.

FIG. 1 illustrates apparatus for producing a coherent nonwoven structure or body 10 of short chopped or discontinuous lengths of glass strand. The apparatus provides a supply system 12 advancing continuous filament glass strands 14 to a cutting or chopping arrangement 16, from which short lengths of glass strand 18 shower to collect as a layer 20 on a surface. Subsequently the apparatus nonadhesively joins the short lengths of chopped glass strand 18 together into the coherent body or structure 10.

The supply system 12 includes supply packages 22 of glass strands or roving 14 held on suitable support means 24 and a guide network for directing the continuous filament glass strands 14 from the supply packages 22 to the cutting arrangements 16. As shown, the guide network includes a plurality of guide tubes 26 extending from their entrance ends at a location adjacent to their associated supply packages 22 to terminate adjacent to the cutting arrangement 16. As shown, the guide tube 26 curve from a location above the cutting arrangement 16 to feed the strands 14 along a substantially vertical path to the cutting zone.

One may use other supply arrangements such as the apparatus of a filament forming location. For glass strands such a filament forming location includes a source of molten glass from which one may attenuate a plurality of individual continuous glass filaments. One may combine these filaments into one or more bundles or glass strands, e.g. strands 14, or maintain the filaments as individual elements for subsequent processing.

The cutting arrangement 16 includes a cutter or chopper roll 28 and a cot roll 30, the rolls being associated in cutting arrangement. Suitable means drives either of the rolls 28 or 30 or alternately both rolls in synchronism. As illustrated, the apparatus employs a comb or thread board 32 located between the terminating ends of the guide tubes 26 and the rolls 28 and 30. The glass strands 14 travel individually through the thread board 32 in separated relationship with each other. A motor and drive means reciprocates the thread board 32 lengthwise of the cutter and cot rolls 28 and 30 to move the glass strands 14 together back and forth along the length of the rolls. Such reciprocal movement of the strands 14 distributes wear along the entire length of the cutter and cot rolls 28 and 30 to prolong their cutting life and assists the apparatus to distribute the chopped material.

One can supply individual continuous filaments to the cutting arrangement 16 to chop individual filaments of desired length.

In operation the rotating and engaged cutter roll 28 and cot roll 30 pull the strands 14 from their supply packages 22 and cut or chop them into short predetermined desired lengths 18. These chopped strands 18 are bundles of filaments of equal length, viz the length of the chopped strands 18. While the normal range of the short lengths of the cut glass strands 18 is from between one to ten inches, their length can be less than one inch and greater than ten inches, e.g. two feet or more.

As shown, the chopper or cutting arrangement 16 is above a conveyor unit 36 including a continuous conveyor belt 38 and side walls 40. A motor and drive means moves the continuous belt 38 to advance it under the cutting arrangement 16.

The chopped or cut lengths of glass strand 18 shower onto the moving surface of the advancing continuous belt and accumulate to form a continuous layer 20 of promiscuously or randomly disposed short lengths of glass strand 18. The side walls 40 function as barriers to keep the falling lengths of chopped glass strands 18 in the collection zone on the moving belt 38.

One may vary the speed of the conveyor belt 38 and/or the operation of the cutting arrangement 16 to collect a compact layer 20 of desired thickness. The thickness of the layer 20 must be sufficient to be nonadhesively united into a coherent structure.

The continuous belt 38 advances the layer 20 to a sewing device 42 including bobbins 44 supplying thread 46 to a stitching or sewing head 48. The sewing device 42 extends transversely across the entire width of the conveyor unit 36. The stitching or sewing head 48 possesses numerous sewing stations to join the strands 18 of the layer 20 together into a coherent body. The stitches should be loose enough to prevent puckering, i.e. loose enough to keep the coherent layer flat.

In practice the head 48 sews a plurality of spaced apart normally straight line rows of stitches 49 extending lengthwise of the layer 20. The space between the rows changes with the length of the chopped strands 18. The rows of stitches must be sufficiently close to unite the glass strands 18 together into the coherent body or structure 10. Normally the rows are spaced apart at a distance of from ⅛ to ¼ the length of the chopped strands 18. For example, a structure made of chopped strands 18 having a length of 2 inches would usually have a distance of from ¼ to ½ an inch between the rows of stitches; a structure of chopped strands 18 having a length of 8 inches would have stitches spaced a distance of from 2 to 4 inches between rows. The invention can use other stitching dispositions, e.g. zig-zag. Moreover, one may use other methods to join the chopped strands 18 together in interdependent relationship into a coherent structure, e.g. knitting.

One amy employ a wide range of threads or threadlike material 46, e.g. multifilament or monofilament. Normally, a high strength and low elongation thread such as polyester is desirable. Further, one may employ glass or cotton threads. It may be useful to have the threads subject to dissolving by chemical action of the resinous material reinforced by the structure 10. Thus, the use of the term "thread" as used in the accompanying claims should be interpreted broadly enough to encompass all types of thread and threadlike material.

As indicated in FIG. 1, the continuous belt 38 dips away from the sewing zone to permit stitching. The sewing device 42 provides a supporting guide plate under the layer 20 and a walker shoe, which cooperate to support and move the layer 20 into the sewing zone as the belt 39 dips away and out of supporting relation with the layer 20. Aligned openings in the guide arrangement permit the needles of the sewing head 48 to pierce through the layer 20 to stitch it together.

Upon leaving the sewing device 42 the coherent nonwoven structure passes between compaction rolls 50 and 52 to press the structure 10 into a uniform thickness. One can suitably heat the compaction rollers 50 and 52 to fuse the stitching thread to portions of strands in the layer 20. The heat should not be intense enough to cause the thread to lose its ability to hold the layer 20 together.

After the compaction rolls 50 and 52 the layer 20 moves to a needling or needle punching unit 54 having a plurality of needles, which perforate or form openings 55 in the layer 20. Thus, the structure 10 possesses a plurality of perforations or needled openings 55 after passing through the needling unit 54. The filaments of the strands 18 are somewhat separated in the region of the perforations. One may produce a coherent nonwoven structure without the openings 55.

After leaving the unit 54, the perforated coherent structure 10 moves across a slitter unit 56 including disc cutters 58 and an arbor 60. The slitter unit trims the lengthwise edges of the structure 10.

A roll-up unit 62 winds the structure 10 into a wound collection package 64.

The apparatus includes a cutoff unit 66 that severs the structure 10 upon completion of a collection package 64 to wind a package having desired lengths of the structure 10 therein.

As easily seen in FIG. 1, the nonwoven structure 10 includes an accumulation of promiscuously disposed discontinuous lengths of glass strands 18 where threads interengage the discontinuous strand lengths at spaced zones located sufficiently close that the thread units the discontinuous glass strands together into a coherent body.

Figure 2:
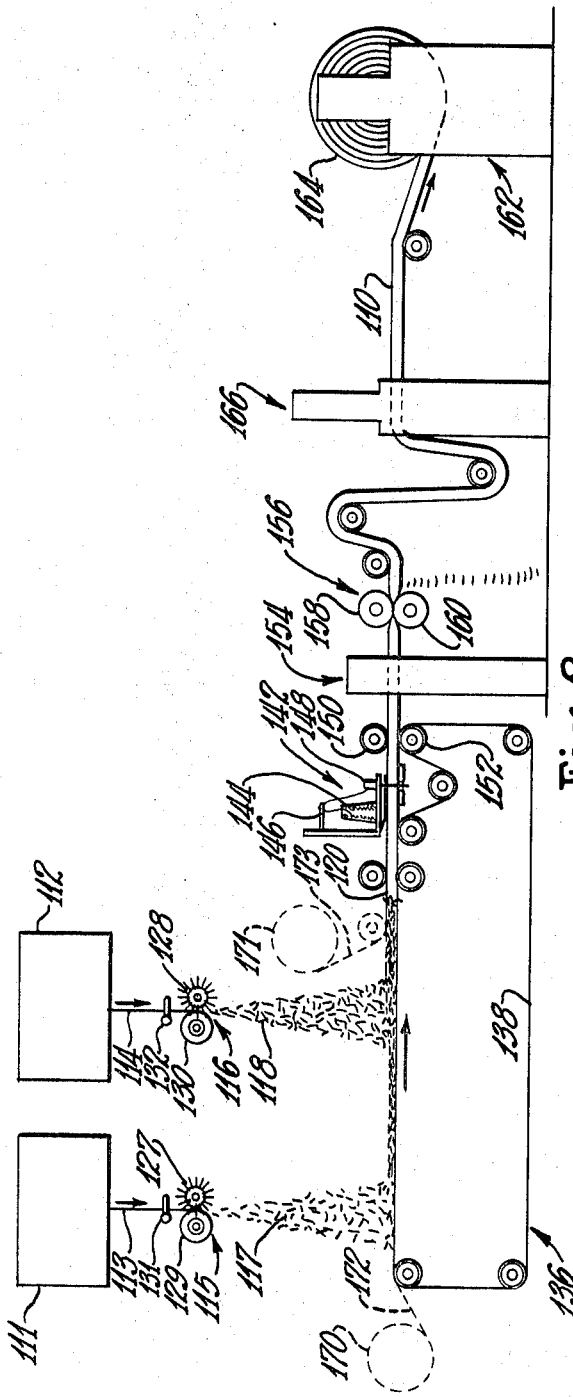
FIG. 2 is a view in elevation showing apparatus for producing a nonwoven structure according to the principles of the invention where there are two strand supply stations.

FIG. 2 illustrates apparatus for producing a coherent nonwoven structure or body 110 of short chopped or discontinuous lengths of glass strand. The apparatus provides two strand supply means 111 and 112, each providing a plurality of continuous filament glass strands. As shown, the supply means provide strands 113 and 114 to separate cutting or chopping arrangements 115 and 116 repsectively, from which desired lengths of glass strands 117 and 118 shower to collect on a moving surface. Subsequently the apparatus nonadhesively joins the lengths of chopped glass strand 117 and 118 together into a coherent body or structure 110.

The suppiy means 111 and 112 may be similar to the supply system 12 shown in FIG. 1 or may be any other appropriate supply means providing a plurality of strands.

As discussed in relation to the apparatus shown in FIG. 1, one may use other supply arrangements such as the apparatus of a filament forming location. For glass strands such a filament forming location includes a source of molten glass from which one may attenuate a plurality of individual continuous glass filaments. One may combine these filaments into one or more bundles of glass strands, e.g. strands 113 and 114, or maintain the filaments as individual elements for processing.

The cutting arrangements 115 and 116 include cutter or chopper rolls 127 and 128 and cot rolls 129 and 130 respectively, the cutting and cot rolls being associated in cutting arrangement. Suitable means drives either of the rolls, or alternately both rolls in synchronism. As illustrated the apparatus employs combs or thread boards 131 and 132 located between the supplies 111 and 112 and the cutting arrangements 115 and 116 respectively. The glass strands 113 and 114 travel individually through the thread boards 131 and 132 in separated relationship with each other. A motor and drive means reciprocates the thread boards lengthwise of the cutter and cot rolls to move the glass strands together back and forth along the length of the rolls. Such reciprocal movement of the strands distributes wear along the entire length of the cutter and cot rolls 127, 128, 129 and 130 to prolong their cutting life and further assist the apparatus distributing the chopped material onto the moving collection surface.

As in the case of the apparatus shown in FIG. 1, one may supply individual continuous filaments to the cutting arrangements 115 and 116 to chop individual filaments of desired length.

In operation the rolls of the cutter arrangements 115 and 116 pull the strands 113 and 114 respectively from their supply sources and cut or chop them into predetermined desired lengths 117 and 118 respectively. These chopped strands 117 and 118 are filament bundles of equal length, viz the length of the chopped strands themselves. As in the case of the chopped strands 18 discussed in relation to the apparatus shown in FIG. 1, the normal length of the cut or discontinuous glass strands 117 and 118 is from between 1 and 10 inches; however, their length may be less than 1 inch and greater than 10 inches, e.g. two feet or more.

As shown, the chopper arrangements 115 and 116 are above a conveyor unit 136 including a continuous conveyor belt 138. A motor and drive means moves the continuous belt 138 to advance it under the cutting arrangements or stations.

The chopped or cut glass strands 117 and 118 shower onto the moving surface of the advancing continuous belt 138 at separate spaced apart zones to accumulate and form a continuous layer 120 of promiscuously or randomly disposed short desired lengths of glass strands 117 and 118.

One may vary the speed of the conveyor belt 138 and/or the operation of the cutting arrangements 115 and 116 to collect a compact layer 120 of desired thickness. The thickness of the layer 120 must be sufficient to be nonadhesively united into a coherent structure.

While the strands 113 and 114 (also the chopped strands 117 and 118) are often identical, it is often advantageous to have them dissimilar. For example, one may modify the cutting arrangements 115 and 116 to cut chopped strands of different lengths, e.g. where chopped strands 117 are longer than chopped strands 118. Moreover, the filament count or number of filaments in the strands may vary, e.g. strands 117 may have more filaments than strands 118. Also, the filament diameters making up the different strands may be of different diameter. Furthermore, the strands may be of different material, e.g. strand 113 may be multifilament nylon and strand 114 may be multifilament glass.

When the strands 113 and 114 are dissimilar, the collected chopped material on the moving conveyor 138 accumulates essentially as two layers, each of which includes chopped linear material varying in certain aspects.

The continuous belt 138 advances the layer 120 to a sewing device 142 including bobbins 144 supplying thread 146 to a stitching or sewing head 148. The sewing device 142 extends transversely across the entire width of the conveyor unit 136. The stitching or sewing head 148 possesses numerous sewing stations to join the discontinuous strands 117 and 118 of the layer 120 together into a coherent body. The stitches should be loose enough to prevent puckering, i.e. loose enough to keep the coherent layer 120 flat.

As in the case of the sewing head 48 described in relation to the apparatus of FIG. 1, in practice head 148 sews a plurality of spaced apart normally straight line rows of stitches extending lengthwise of the layer 120. The space between the rows changes with the length of the chopped strands 117 and 118. The rows of stitches must be sufficiently close to unite the glass strands together into a coherent body or structure 110. Normally the rows are spaced apart a distance of from ⅛ to ¼ the length of the shortest chopped strands when one employs chopped strands of more than one length. If all the chopped strands 117 and 118 are the same length, the spacing between the rows is the same as the spacing used with respect to the nonwoven structure 10.

One can use other means to join the strands 117 and 118 together in interdependent relationship into a coherent structure. Further, as in the case of the nonwoven structure 10, one may employ a wide range of filament threads or thread-like material, e.g. multifilament or monofilament.

Upon leaving the sewing device 142 the coherent nonwoven structure passes between compaction rolls 150 and 152 to press the structure 110 into uniform thickness.

After the compaction rolls 150 and 152 the layer 120 moves to a needling or needle punching unit 154 having a plurality of needles that perforate or form openings in the layer 120. Thus the structure 110, as with the structure 10, possesses a plurality of perforations or needle openings after passing through the needling unit 154. Filaments of the strands 117 and 118 are somewhat separated in the region of the perforations. One may produce a nonwoven coherent structure 110 without the openings.

After leaving unit 154, the perforated coherent structure 110 moves across a slitter unit 156 including disc cutters 158 and an arbor 160. The slitter unit 156 trims the lengthwise edges of the structure 110.

A rollup unit 162 winds the structure 110 into a wound collection package 164.

The apparatus includes a cutoff unit 166 that severs the structure 110 upon completion of a collection package 164.

As indicated by the dashed lines shown in FIG. 2, one may modify the apparatus of either FIG. 1 or 2 to include means for supplying linear material to either or both major surfaces of the accumulated layer, e.g. layers 20 and 120. As shown, a supply spool such as a beam 170 supplies glass strand 172 to what is shown as the bottom surface of the layer 120. A supply spool such as a beam 171 supplies glass strand 173 to the top surface of the layer 120.

Figure 3:
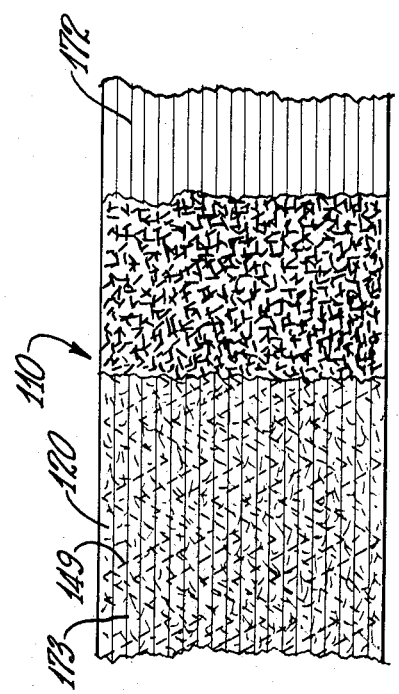
FIG. 3 is a plan view of another nonwoven structure according to the principles of the invention.

FIG. 3 shows a nonwoven structure 110 with the glass strands 172 and 173 at its major surfaces extending in adjacent mutually parallel relationship lengthwise of the structure 110. Because the stitching must both unite the layer of discontinuous strands and the continuous strands 172 and 173, the stitches are spaced apart in nonlinear rows, e.g. zig-zag rows 149.

The surface strands 172 and 173 increases the surface impact strength of articles, e.g. laminates, reinforced with the nonwoven structure of the invention.

It is apparent that within the scope of the invention modifications and different arrangements may be made other than as herein disclosed. The present disclosure is merely illustrative, the invention comprehending all variations thereof.

I claim:

1. A nonwoven mat for reinforcing resinous material to be combined therewith comprising:
   a layer of short length bundles of generally parallel glass fibers promiscuously disposed; and
   thread interengaging the layer at spaced zones located sufficiently close to unite the glass fiber bundles together into a flexible coherent body, the coherent body of glass fiber bundles having a porosity sufficient to permit resinous material to be combined therewith to flow throughout the body.

2. A nonwoven structure for reinforcing resinous material combined therewith comprising:
an accumulation of promiscuously disposed chopped glass strands; and
spaced apart rows of stitching located sufficiently close to unite the chopped glass strands together into a flexible coherent body, the coherent body having a permeability sufficient to permit flow resinous material to spread throughout the body.

3. A nonwoven structure recited in claim 2 where the chopped glass strands include strands of more than one length.

4. A nonwoven structure recited in claim 2 where the glass strands include strands of more than one filament count.

5. A nonwoven structure recited in claim 2 where the glass strands include strands of different filament diameter.

6. The structure recited in claim 2 where the glass strands are of substantially uniform length, such length being in a range of from 1 to 24 inches.

7. The structure recited in claim 2 where the rows of stitches are spaced apart at a distance of from 1/8 to 1/4 the length of the chopped glass strands.

8. A nonwoven mat for reinforcing resinous material combined therewith comprising:
a layer of promiscuously disposed discontinuous lengths of glass strands;
a plurality of adjacent generally mutually parallel continous glass strands on a major surface of the layer; and
spaced apart nonlinear rows of threads interengaging the strands, the rows being sufficiently close to unite the continuous glass strands and the discontinuous glass strands into a flexible coherent body, the coherent flexible body having a permeability sufficient to permit flowable resinous material to spread throughout the body.

9. A nonwoven structure recited in claim 8 further including a plurality of generally mutually parallel continuous glass strands on the opposed major surface of the layer, the continuous glass strands on the opposed major surfaces extending in the same direction.

References Cited

UNITED STATES PATENTS

| | | | |
|---|---|---|---|
| 230,891 | 8/1880 | Noyes et al. | 112—420 |
| 2,731,066 | 1/1956 | Hogendobler et al. | 161—141 |
| 2,771,387 | 11/1956 | Kleist et al. | 161—141 |
| 2,794,238 | 6/1957 | Dildilian et al. | 161—141 X |
| 3,260,640 | 7/1966 | Owen | 112—420 X |

ALFRED R. GUEST, Primary Examiner